United States Patent
Pearce

[19]

[11] Patent Number: 6,108,267
[45] Date of Patent: Aug. 22, 2000

[54] NON-LIQUID FILLED STREAMER CABLE WITH A NOVEL HYDROPHONE

[75] Inventor: Richard E. Pearce, Roanoke, Tex.

[73] Assignee: Innovative Transducers, Inc., Fort Worth, Tex.

[21] Appl. No.: 09/189,086

[22] Filed: Nov. 9, 1998

Related U.S. Application Data

[63] Continuation-in-part of application No. 08/744,693, Nov. 7, 1996, Pat. No. 5,883,857.

[51] Int. Cl.⁷ ...................................................... G01V 1/38
[52] U.S. Cl. ......................... 367/20; 367/154; 174/101.5
[58] Field of Search .................. 367/20, 154; 174/101.5

[56] References Cited

U.S. PATENT DOCUMENTS

| | | |
|---|---|---|
| 2,632,150 | 3/1953 | Silverman et al. . |
| 2,762,032 | 9/1956 | Vogel . |
| 3,710,006 | 1/1973 | Davis ................................... 171/101.5 |
| 3,739,326 | 6/1973 | Kerr et al. ............................... 367/159 |
| 3,798,474 | 3/1974 | Cassand et al. ......................... 310/9.6 |
| 4,023,562 | 5/1977 | Hynecek et al. .................... 128/2.05 E |
| 4,092,628 | 5/1978 | Hall, Jr. ..................................... 340/10 |
| 4,281,402 | 7/1981 | Kruka et al. ............................... 367/15 |
| 4,491,939 | 1/1985 | Carpenter ................................... 367/20 |
| 4,525,564 | 6/1985 | Shirley et al. ........................... 310/331 |
| 4,653,036 | 3/1987 | Harris et al. ............................. 367/170 |
| 4,789,971 | 12/1988 | Powers et al. ........................... 367/152 |
| 4,805,157 | 2/1989 | Ricketts .................................. 367/119 |
| 4,810,913 | 3/1989 | Beauducel et al. ...................... 310/337 |
| 4,838,088 | 6/1989 | Murakami ................................. 73/724 |
| 4,958,329 | 9/1990 | Marschall ................................. 367/20 |
| 5,361,240 | 11/1994 | Pearce ..................................... 367/157 |
| 5,367,497 | 11/1994 | Marschall ................................. 367/20 |
| 5,371,428 | 12/1994 | Kikuchi et al. .......................... 310/324 |
| 5,381,382 | 1/1995 | Marschall ................................. 367/20 |

*Primary Examiner*—Ian J. Lobo
*Attorney, Agent, or Firm*—Madan, Mossman & Sriram, P.C.

[57] ABSTRACT

A non-fluid-filled streamer cable or towed array for performing seismic surveys in water-covered areas includes a plurality of serially coupled active cable sections. Each active cable section includes an electromechanical cable that contains a single central strain member. A wire bundle is placed around the central strain member for transporting electrical power and data through the active section and an inner protective jacket is formed around the central strain member and wire bundle. A foam material is extruded around the inner protective jacket to provide a predetermined buoyancy to the fully assembled active cable section and an outer protective jacket is formed around the foam jacket. A potting compound is formed between, and bonds to, the inner protective jacket and outer protective jacket to provide a water block at each hydrophone location.

7 Claims, 6 Drawing Sheets

NON-LIQUID FILLED STREAMER CABLE WITH A NOVEL HYDROPHONE

This application is a continuation-in-part of Ser. No. 08/744,693, now U.S. Pat. No. 5,883,857, entitled "Non-Liquid Filled Streamer Cable With A Novel Hydrophone" (Pearce) filed Nov. 7, 1996.

BACKGROUND OF THE INVENTION

1. Field of the Invention

This invention relates generally to the field of seismic surveying and more particularly to a no-liquid filled streamer cable for use in performing seismic surveys under water.

2. Description of the Related Art

To perform seismic surveys over water-covered areas, such as offshore, to obtain information about subsurface formations for recovery of hydrocarbons (oil and gas), one or more strings of hydrophones are towed behind a vessel designed for performing seismic surveys. Such strings of hydrophones are typically referred to in the art as "streamer cables" or "towed arrays." For three dimensional seismic surveys, several streamer cables (generally between 4 and 12) are deployed simultaneously, each such cable extending usually between three (3) and eight (8) kilometers. Each streamer cable is normally made by serially joining smaller sections of 75 meters to 150 meters in length, referred to in the art as "active cable sections." The streamer cables are generally towed twelve to thirty feet below the water surface to reduce the effect of surface waves and surface reflection noise on the hydrophones. However, towing streamer cables at such depths requires great pulling force, hence the need for larger and more powerful vessels, which in turn increases the capital and operating costs. It is, therefore desirable to have streamer cables which are less susceptible to surface waves so that they may be deployed near the water surface.

To perform a seismic survey, acoustic shock waves are generated at selected points in relation to the streamer cables. These shock waves travel down to the subsurface formations and are reflected by subterranean bed boundaries back to the streamer cables through the earth and water. The reflected shock waves are detected by the hydrophones, which produce corresponding signals. These signals are processed to obtain seismographs of the earth's subsurface beneath the streamer cables.

Each active cable section of commercially available streamer cables is typically made up of a flexible sealed tubular outer jacket made from polyurethane or a similar material. Multiple (generally between two and five) strain members in the form of cables made from steel or aramid fibers or other high strength materials, such as those sold under the trade names of Kevlar or Vectran, are spaced apart axially along the entire length of the active cable section. Typically, the strain members are deployed near the inside surface of the flexible tubular member to absorb the pulling forces when the streamer cable is towed behind the vessel. The hydrophones are typically placed in the space between the strain members. To detect very small reflections from the subterranean formations, equispaced groups of hydrophones (typically between 8 and 14) are placed in each active section. A one hundred (100) meter active section typically may use between 96 and 150 hydrophones. Electronic circuitry, such as preamplifiers, circuits to digitize the analog hydrophone signals and wires to provide two way signal and data communication between the active section and control units located at the vessel are placed between the active sections. Since the streamer cable is towed at a predetermined depth below the water surface, the cable is made to have a desired predetermined buoyancy. For this purpose, all of the empty space inside the outer housing is filled with a nonconductive light fluid, such as kerosene.

The above-described streamer cables suffer from a number of significant problems. The outer jacket is typically only a few millimeters thick and is, thus, relatively weak. The streamer cables are normally spooled on large drums for storage on the vessels and often rupture during winding (spooling) and unwinding operations. Additionally, the outer jacket often ruptures during towing, due to fishing boats inadvertently passing over the streamer cables, fish bites and the streamer cable becoming entangled with offshore structures. Seismic survey companies spend large amounts of monies in repairing such cables and typically keep excessive inventory of such cables. Outer jacket ruptures during surveying operations can require shut down of the surveying operations. Such down times can be very expensive due to large capital cost of the vessels and the lost time of the crew, which can be several thousand dollars per hour.

The fluid in the cable also causes a number of problems. As the streamer cable is towed, waves are created within the fluid in each active section. Such waves tend to impart noise in the hydrophones, thereby degrading the quality of the detected signals. Further, each time a surface wave crashes into the streamer cable, it creates an acoustic source, which transmits through the fluid in the form of noise. Additionally, fluid-filled streamer cables are affected by the ripples at the water surface. For these reasons, fluid-filled streamer cables are towed several feet, usually between 12 and 30 feet, below the water surface. Additionally, kerosene is toxic and highly flammable, which creates safety, health and environmental problems. Any streamer cable fluid leaking into the ocean is also hazardous to marine life. Attempts have been made to design streamer cables that are not filled with any fluid and do not utilize flexible outer housings or shells. However, such streamer cables have not been commercially successful. The present invention addresses these problems and provides a streamer cable, wherein a foam is extruded during the manufacturing of the cable to provide the desired buoyancy. The outside of the cable is made from an extruded jacket of a material that is sufficiently strong to provide a relatively rugged surface for handling. The streamer cable of the present invention is not susceptible to ruptures as are the fluid-filled streamer cables.

The use of multiple stress members causes several problems. First, it reduces the useful space available in the active section for the placement of hydrophones and desired electronic circuits. Second, the strain members are typically not identical, which causes uneven load sharing between the various strain members. Third, the strain members outside the hydrophones vibrate under load and thereby create noise in the hydrophones. These strain members are subject to failure because of bending loads during reeling. The present invention addresses these problems and provides a steamer cable that utilizes a single central strain member. Hydrophones are placed on the outside and around the stress member. The single strain member in the middle is lighter than the combined weight of multiple stress members of the prior art streamer cables, allows forming hydrophones around the strain member instead of in the space between the multiple stress members, and is less affected by bending loads during reeling. This design allows building a relatively small diameter and lighter cable compared to the commercially available fluid-filled streamer cables.

As noted earlier, typical prior art streamer cables utilize between 96 and 150 hydrophones per 100 meter section.

Groups of hydrophones are usually used to detect signals corresponding to a single point in the cable. Signals from all the hydrophones in each group are combined to increase the signal amplitude and to reduce the effect of various types of noises present in the fluid-filled streamer cables. A number of hydrophones are utilized partially to compensate for such noises. The cable design of the present invention is inherently less noisy and, thus, allows for the use of relatively fewer number of hydrophones per active cable section.

Additionally, the present invention provides a hydrophone that is placed around the stress member that has higher signals to noise ratio compared to the prior art hydrophones and receives unimpeded signals from the subterranean formations surfaces, i.e., around 360 degrees around the streamer cable. Due to the availability of space between the inside of the hydrophone and the central strain member, some of the essential electronic circuits, such as preamplifiers, can be placed within the hydrophone, thereby reducing the distance between the sensor and the preamplifier.

SUMMARY OF THE INVENTION

The present invention provides a non-fluid-filled streamer cable or towed array for performing seismic surveys in water-covered areas. The streamer cable includes a plurality of serially coupled active cable sections. Each active cable section includes an electro-mechanical cable that contains a single central strain member. A wire bundle is placed around the central strain member for transporting electrical power and data through the active section and an inner protective jacket is formed around the central strain member. A non-conductive foam material is extruded around the central strain member to provide a predetermined buoyancy to the fully assembled active cable section. An outer protective jacket is formed around the foam jacket for protecting the cable from the outside environment.

A number of hydrophones are formed around and outside the electro-mechanical cable. The hydrophone preferably includes a pair of active elements connected in series opposition. Electronic components, such as preamplifiers, are placed within the hydrophones. A potting compound is formed between, and bonds to, the inner protective jacket and outer protective jacket to provide a water block at each hydrophone location.

The present invention also provides a method for forming an active cable section for use in a streamer cable to be towed behind a vessel for performing seismic surveys in water-covered areas. The method includes the steps of: providing a longitudinal strain member along the active cable section for absorbing stresses when the streamer cable is towed behind the vessel; forming an inner protective jacket around the longitudinal strain member; forming a foam jacket around the inner protective jacket to provide a predetermined buoyant force to the active cable section when placed in water; forming an outer protective jacket around the foam jacket for protecting the cable from the outside environment; and forming a plurality of spaced hydrophones around and outside the longitudinal strain member. A potting compound is formed and bonded to the inner protective jacket and the outer protective jacket for providing a water block at each hydrophone location.

Examples of the more important features of the invention thus have been summarized rather broadly in order that the detailed description thereof that follows may be better understood and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

Figure 1A:
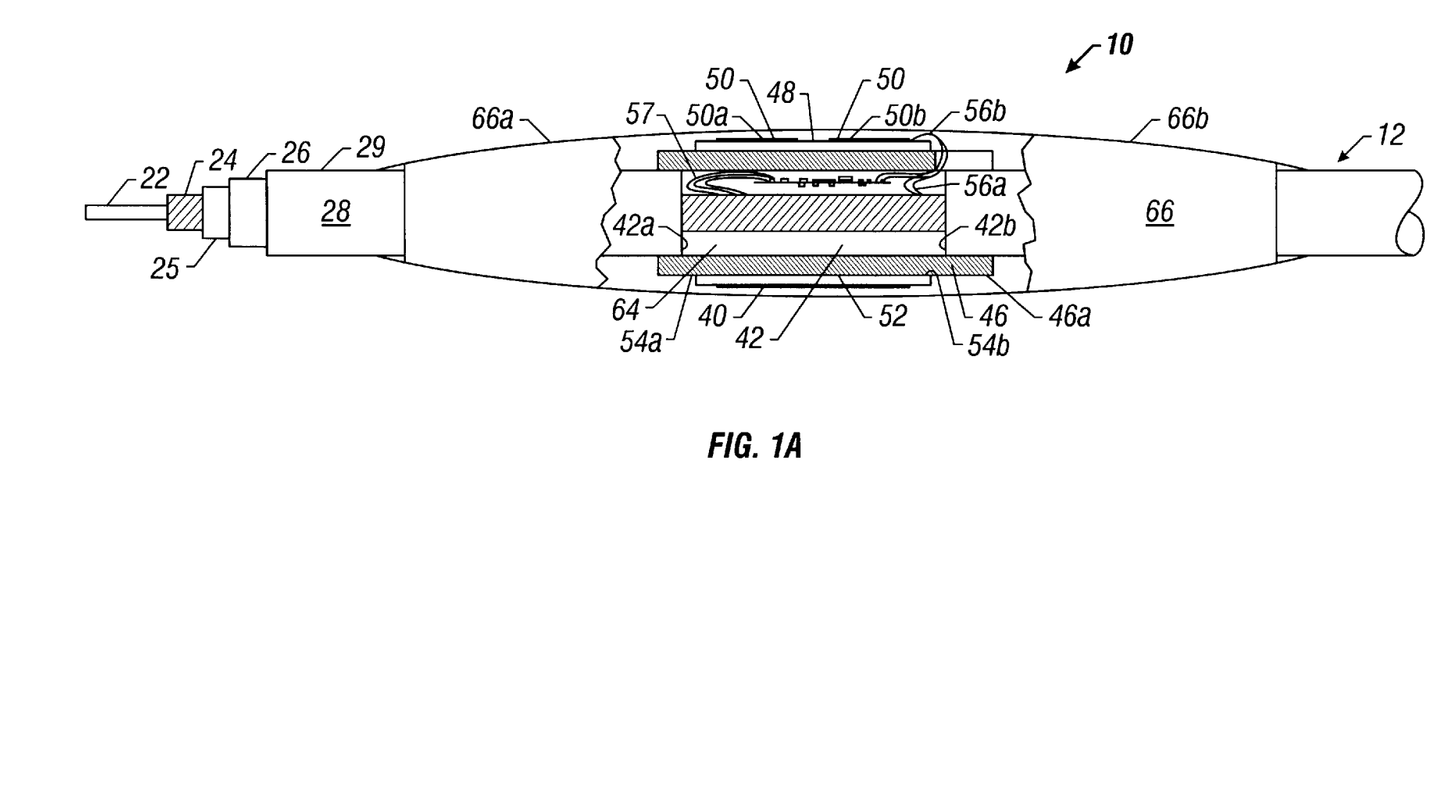
FIGS. 1A–1C show a partial sectional view (FIG. 1A) and sectional views of (FIGS. 1B–1C) of a hydrophone and cable according to the present invention.
Figure 1B:
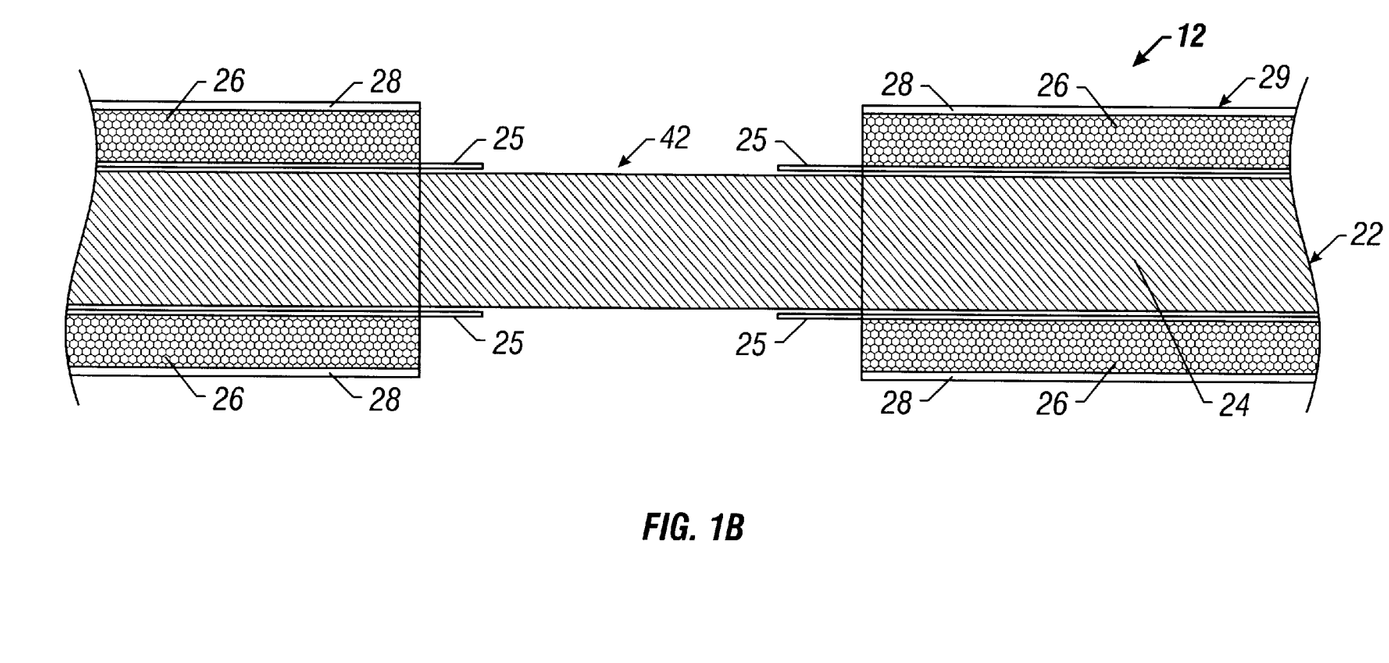
Figure 1C:
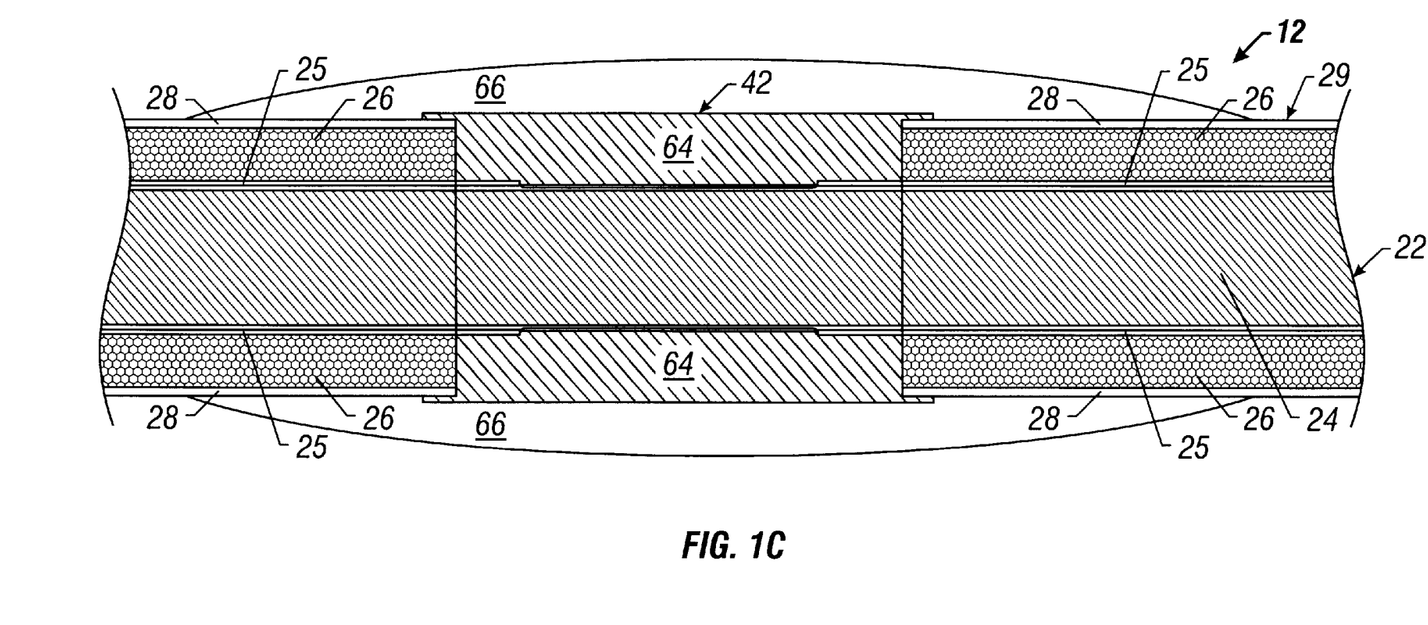

The seismic cable according to the present invention includes a plurality of active cable sections connected in series. Each active cable section contains a plurality of spaced novel hydrophones formed integral to the cable according to the present invention. The hydrophones are attached outside and around an electromechanical buoyant cable. The active cable sections are interconnected by suitable end connectors placed at either end of each active cable section. The use of various types of end connectors on active sections is well known in the art and is thus not described herein. The construction of the electromechanical cable of the present invention and that of a single novel hydrophone around and outside the cable is first described. Accordingly, FIGS. 1A–1C show a partial sectional view (FIG. 1A) and sectional views of (FIGS. 1B–1C) of the preferred manner of placing the novel hydrophone on the cable according to the present invention.

The electro-mechanical cable or the floatation cable ("cable") 12 of the present invention includes a central strain member 22. The strain member 22 is made from a material that will be able to withstand the towing or pulling forces with relatively minimal change in length when the streamer cable is towed behind a vessel. For the purpose of this invention, the strain member is preferably made from an aramid fiber. The strain member 22, however, may also be made of steel wires or from any other desired materials. A wire bundle 24, having a desired number of wires, is wrapped around the strain member 22. The wire bundle 24 includes wires to carry power from a source (generally on the vessel) to each of the electronic circuit board, if any, in the cable 12 and wires for transporting data and signals to and from the hydrophones in the cable sections. Fiber optic cables are preferably utilized for transporting data in the cable 12.

An inner protective jacket 25 is formed around the central strain member 22 and the wire bundle 24. The inner protective jacket 25 is, preferably, extruded from a material from a group such as polyurethane, polyethylene and polycarbonate. A foam jacket 26 is extruded over the inner protective jacket 25 along the length of the cable 12 to provide the desired buoyancy. The type of the foam material and the air pockets present therein define the buoyancy for the active cable section 10. The extrusion process for the foam jacket 26 is controlled to provide a predetermined buoyancy for the active section 10, which is based on the number of hydrophones to be formed in the active cable section 10, electronic circuits to be placed in the cable section and the type and weight of the end connectors to be used. The foam jacket 26 is encased in an outer protective jacket 28, which is preferably extruded from a material from a group such as polyurethane, polyethylene and polycarbonate. The outer protective jacket 28 hermetically seals the cable 12 and provides a smooth outer surface 29.

To attach a hydrophone, generally denoted by numeral 40, at a desired location on the cable 12, the outer protective jacket 28, the foam jacket 26 and the inner protective jacket 25 are removed from a selected segment 42 of the cable 12, providing access to the wire bundle 24. The hydrophone 40 includes a substrate 46, a diaphragm 48 and a pair of active sensor elements 50a–b. The substrate 46 is a cylindrical member made from a suitable metal, such as aluminum, and includes a cavity 47 around its outer surface 46a. The diaphragm 48 is sealed over edges 54a and 54b at the outer surface 46a of the substrate 46, completely enclosing a cavity 47 and forming an enclosed chamber between the substrate 46 and diaphragm 48. Two polarized and substantially identical, active elements 50a and 50b are spaced apart on the outer surface 48a of the diaphragm 48.

Figure 2:
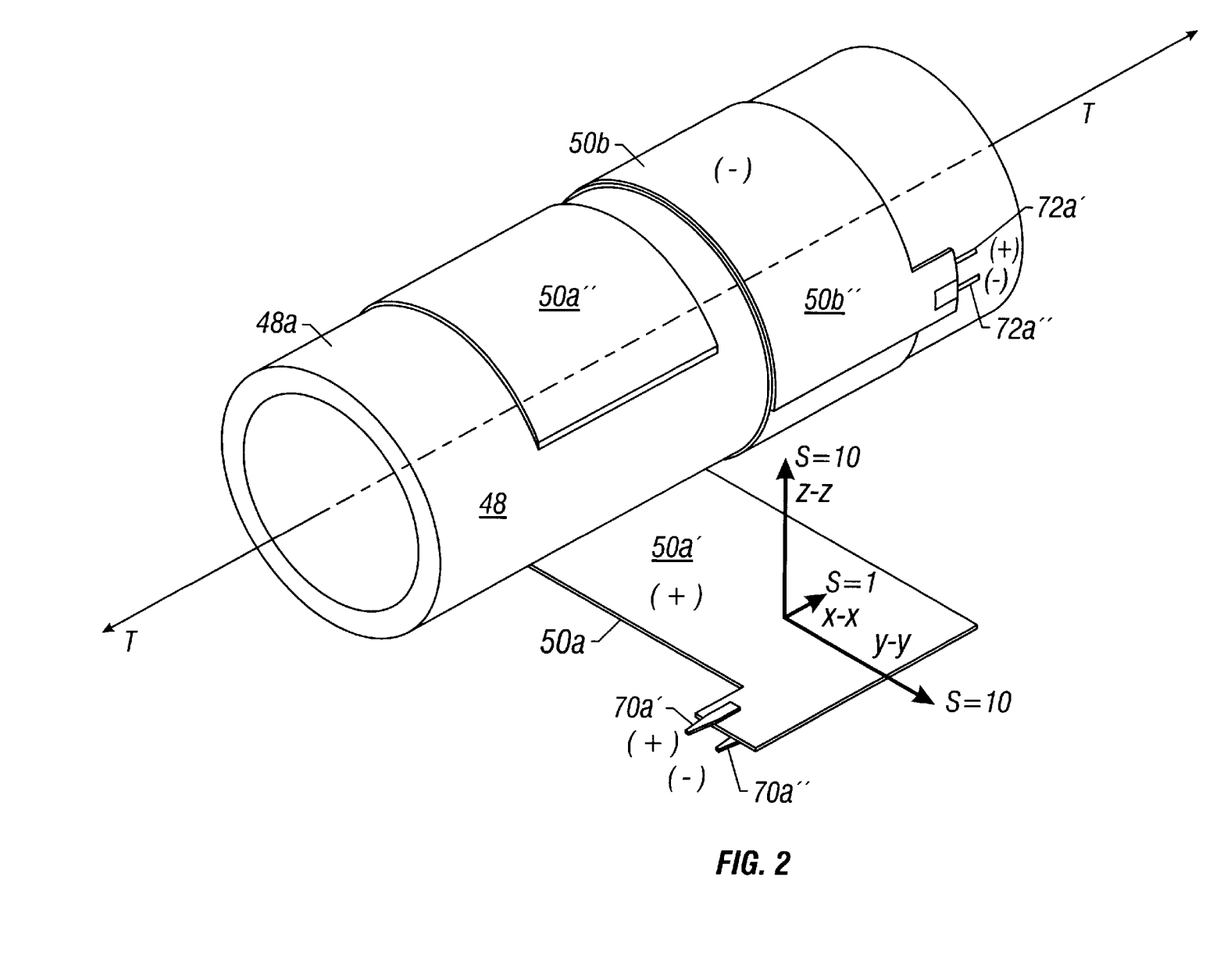
FIG. 2 is an isometric showing the placement of active elements on a diaphragm for use in the hydrophone shown in FIG. 1.

FIG. 2 shows a preferred manner of placing the active elements 50a and 50b on the diaphragm 48. The active elements 50a and 50b are preferably wrapped in opposite directions, i.e., one clockwise and the other counter clockwise. As shown in FIG. 2, the inner surface 50a' of the active element 50a (the surface adjacent to the diaphragm) and the inner surface 50b' of the active element 50b have positive polarities, while their respective outer surfaces 50a" and 50b" have negative polarities. Active element 50a has suitable tabs 70a' and 70a" respectively attached to its inner and outer surfaces 50a' and 50a" for connecting electrical wires thereto as explained later. Similarly, active element 50b has suitable tabs 72a' and 72a" respectively attached to its inner and outer surfaces 50b' and 50b". The two elements 50a and 50b are connected in series opposition, which cancels the noise detected by the two segments 50a and 50b of the active element 50. For example, the tabs 70a' and 72a" may be connected in series and the output of the combined elements 52a and 52b may be derived from the tabs 72a' and 70a". In this manner the two substantially identical active segments 50a and 50b form a single active sensor element 50 which is less susceptible to noise, thereby providing a hydrophone with improved signal to noise ratio compared to commonly used prior art hydrophones. It should be obvious that the polarities described may be reversed. Additionally, the two active elements 52a and 52b may be wrapped in the same direction. Further, the two active elements 52a and 52b may be made into a single overall element or etched or formed into a suitable material.

Still referring to FIGS. 1A–1C and FIG. 2, the active element 50 of the hydrophone 40 is connected to the wire bundle 24 and any electronic circuits in the space 42, such as circuit board 60, via suitable wires 56a and 56b respectively. The electronic circuits 60 preferably include a preamplifier and signal conditioning electronics. The electronic circuit 60 may include circuits to convert the hydrophone signals to digital data and to pass the digitized data on to the appropriate data bus in the wire bundle 24.

To form or attach the hydrophone 40 on the floatation cable 12, the hydrophone subassembly containing the substrate 46, diaphragm 48 and the active element 50 is placed near the space 42. The electrical circuit 60 is installed in the space 42 and the appropriate connections between the active element 50 and the wire bundle 24 and the electronic circuit 60 are made. Any empty space in the space 42 is filled with a potting compound 64 that will bond the substrate 46 to the cable 12. The potting compound 64 is a non-conductive, waterproof material and thus hermetically seals the electronic circuits 60 in the space 42 and insulates the electronic circuits and wire connections from other components and materials in the area 42. The potting compound 64 also provides mechanical damping of the vibrations in the strain member 22 when the streamer cable 10 is towed behind a vessel.

The potting compound 64 is preferably made of a material from a group such as polyurethane, polyethylene and polycarbonate. When the outer protective jacket 28, the foam jacket 26 and the inner protective jacket 25 are removed from the selected segment 42, a portion of the inner protective jacket 25, is left exposed as shown in FIGS. 1B and 1C. The potting compound 64 (shown particularly in FIG. 1C) bonds to the inner protective jacket 25 and the outer protective jacket 28 and seals the foam jacket 26 wherein water is prevented from traveling into the wire bundle 24 and wicking up through the length of the cable 12 essentially providing a water block at each hydrophone 40 location on the cable 12.

The substrate 46 is then bonded over the ends 42a and 42b of the outer jacket 28 of the floatation cable 10. The metal substrate 46, when bonded to the cable 10, acts to prevent lateral flexing of the cable 10 at the hydrophone location, thereby preventing the generation of strain induced noise. The hydrophone 40 is enclosed by a suitable non-conductive material 66, preferably by injection molding a material like polyurethane. The hydrophone section defined by the material 66 preferably has symmetrical tapered ends 66a and 66b and a smooth outer surface to reduce noise resulting from water inflections when the cable 10 is towed behind a vessel.

The electronic circuit 60 within the hydrophone 40 provides for the amplification and filtering of raw hydrophone signals. The circuit may also digitize the sensor signals and/or convert the signals to optical signals and synchronize the digitized signals to a telemetry line contained in the streamer cable 10.

Referring to FIG. 2, the active elements 50a and 50b are preferably made from a polyvinylidene fluoride (PVDF) in the form of thin films which are wrapped around the diaphragm 48 to form parallel cylindrical sensor segments. The PVDF films 50a and 50b are oriented in the hydrophone 40 such that its axis x—x (width axis) is parallel to the towing direction T—T. The axis x—x is less sensitive than the length axis y—y and the thickness axis z—z. The elements are arrayed on a sensing diaphragm such that an extended sampling aperture is formed. The signals from each sensor element 50 in the same group of hydrophones are combined to form a single acoustic channel. The two PVDF elements 50a and 50b of each hydrophone are wrapped in opposing directions to achieve opposition of their output signals to certain external sources.

Figure 3:
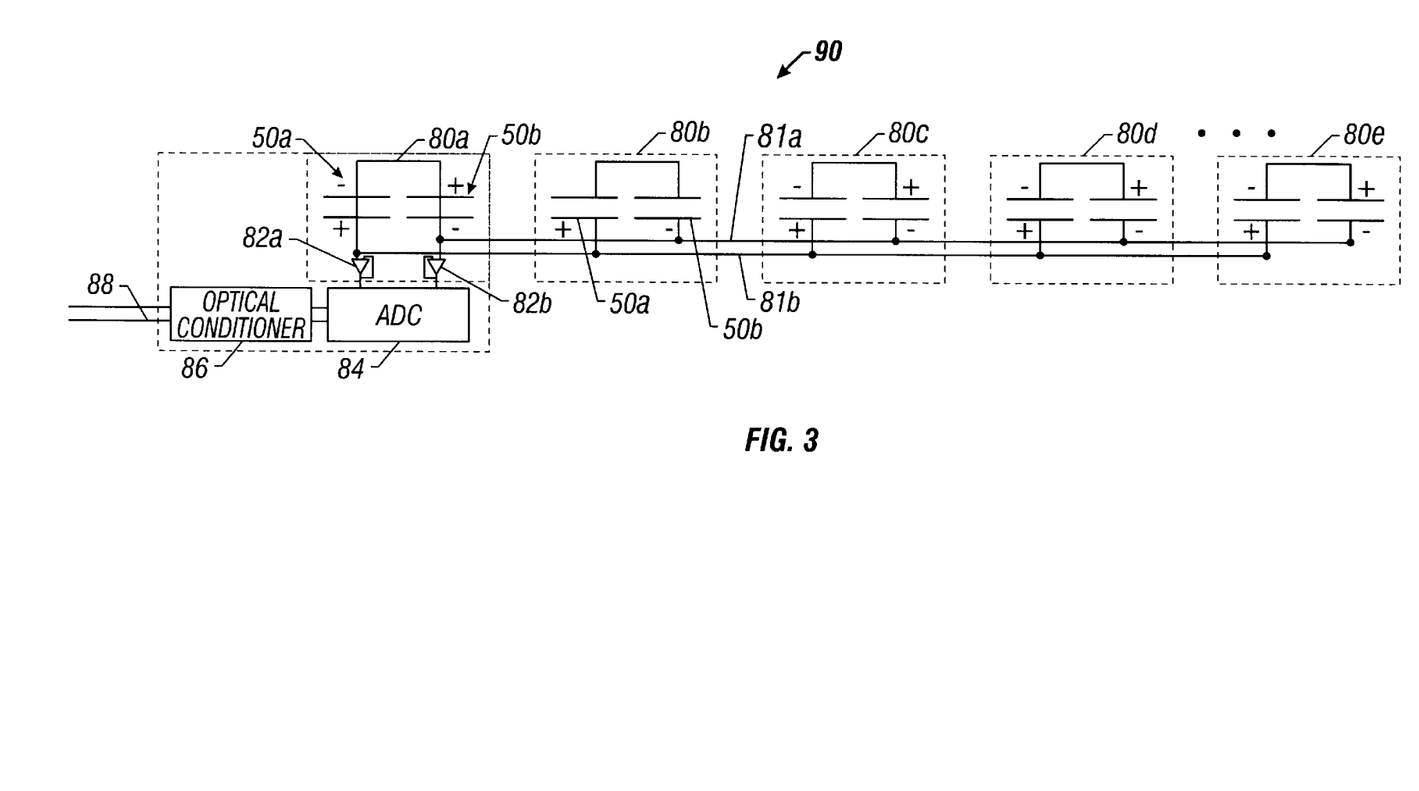
FIG. 3 is a schematic diagram of the electrical connections of a group of hydrophones utilized in an active cable section associated electronic circuits placed in the cable.

FIG. 3 shows a schematic illustration of the interconnection of the hydrophones in a group when the group contains a plurality of hydrophones coupled in series connection. Each hydrophone is shown by a dotted block 80 containing the two active elements 50a and 50b of such hydrophone in series opposition connection. For example, as shown in the first dotted box (hydrophone) 80, the negative side of the active element 50*a* and the positive side of active element 50*b* are connected within the hydrophone 80*a* (in the manner described in FIG. 2), while the positive side of active element 50*a* and the negative side of element 50*b* are respectively coupled to as inputs to pre-amplifiers 82*a* and 82*b*. The active elements of the remaining hydrophones 80*b*–80*n* are connected in parallel with the first hydrophone 80*a*. This may conveniently be accomplished by connecting the negative (−) output of each of the hydrophones 80*b*–80*n* to the negative (−) output of the element 50*a* of hydrophone 80*a* via a line 81*a* and by connecting the positive (+) output of each of the hydrophones 80*b*–80*n* to the positive (+) output of the element 50*a* of hydrophone 80*a* via a line 81*b*. The parallel connection of the hydrophones in a group combines relatively small signals from the individual hydrophones 80*a*–80*n*.

In the above-described configuration, each of the hydrophones 80*a*–80*n* produces signals with less noise compared to the prior art hydrophones due to the use of two active elements 50*a*–50*b* connected in series opposition. Thus, the combined signals from the group of hydrophones 80*a*–80*n* reaching the ADC 84 have greater signal to noise ratio. This allows utilizing fewer number of hydrophones per group compared to the prior art cables. In many applications, only a single hydrophone per group may be sufficient to detect seismic response, which can result in building a lighter cable without sacrificing the signal quality. In a number modern seismic surveys, several (generally 4–8) seismic cables, each nearly six kilometers long, are towed behind a single vessel. Smaller diameter and lighter seismic cables can significantly reduce the requirement for towing capacity and the storing capacity (typically drums) required. Such cables can significantly reduce the handling and operating costs for performing seismic surveys, especially 3D surveys, which usually involve deploying several seismic cables per vessel.

The signals from the pre-amplifiers 80*a* and 80*b* pass to an analog-to-digital converter (ADC) 84, which converts combined signals from the hydrophones 80*a*–80*n* to digital signals. The digital signals from the ADC 84 are converted into optical signals by an optical conditioning device 86, which are then passed to a common telemetry 88. The telemetry 88 receives signals from other hydrophone groups in the active cable section to which the group 90 belongs and from other downstream active cable sections and passes such signals to electronic modules connected between adjacent active cable section as described in more detail below in reference to FIG. 4.

Figure 4:
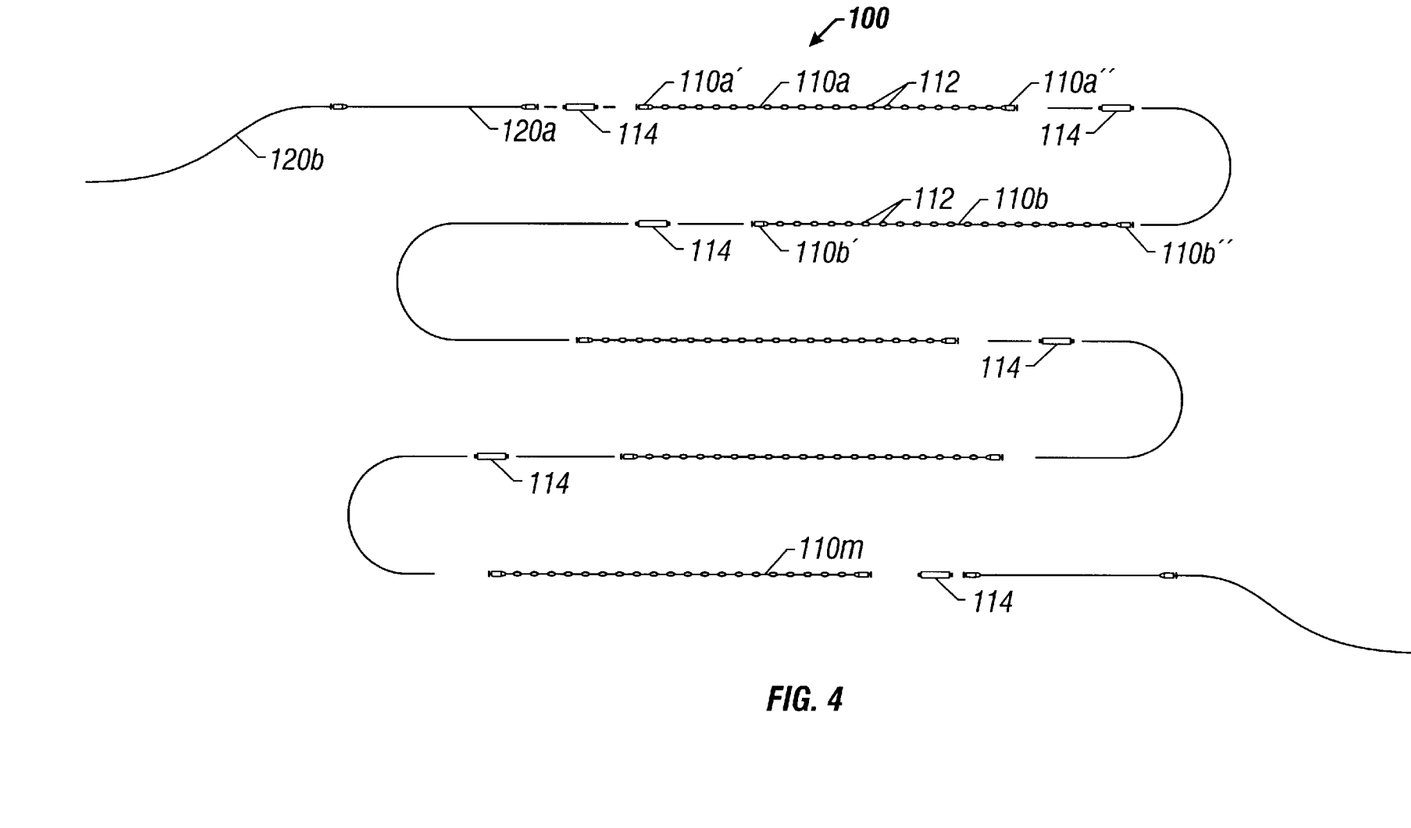
FIG. 4 is a schematic illustration of a plurality of serially connected active cable sections of the present towed behind a vessel for performing seismic surveys in water-covered areas.

FIG. 4 shows a seismic cable 100 of a desired length formed by serially connecting a number of cable active sections 110*a*–110*m*. For simplicity, the first section 110*a* is designated to be placed closest to the vessel (not shown). The cable sections 110*b*–110*m* are connected sequentially to the first section. Each active cable section includes a number of serially placed hydrophones or groups of hydrophones 112 and terminates at each end with an electromechanical connector. The hydrophones 112 are equispaced, while the connectors are identical in construction. Connectors 110*a*' and 110*a*" are shown connected to the cable section 110*a*. Active cable section 110*b* terminates with connectors 110*b*' and 110*b*". Each of the cable sections 110*c*–110*m* contains similar connectors.

An electronic module 114 is coupled between adjoining cable sections 110. The electronic module 114 preferably includes electronic circuits which receive signals from the cable section 110 immediately downstream from it, processes such signals, such as by performing any filtering, etc. and passes the processed signals to a common telemetry or data transmission line 88 in the cable (see FIG. 3). The electronic module 114 also may receive data from all of the cable sections downstream from it and perform any desired processing on such data. The connectors, such as connectors 110*a*', 110*a*", etc., can be identical and the active sections thereby bidirectional. Therefore, the cable sections 100*a*–110*m* they may be connected in any order. Various types connector for use as connectors 110*a*' and electronic modules 114 have been known in the art and are, thus, not described in detail herein. It should be noted that any suitable connectors and electronic modules may be utilized for the purpose of this invention.

One or more elastic sections 120 may be placed at each end of the seismic cable 100 to dampen vibrations and loads from the vessel at the front end and any tail buoys used at the tail end of the cable 100. As noted earlier, the cable sections, such as cable sections 110*a*–110*m*, exhibit reduced susceptibility to vibrations and other noise element due to the use of a single central strain member and a foam jacket around the strain member, the use of one or more of the lead in sections, such as lead in section 120, may be eliminated. The front end of the assembled cable is towed by the vessel, while the tail end is connected to suitable buoys and other navigation equipment, which is well known in the art.

In use one or more streamer cables, such as cables 100, are towed behind a vessel. Each streamer cable 100 is towed at a predetermined depth below the water surface. As noted earlier, the prior art fluid-filled streamer cables are very sensitive to the ripple effects and surface waves. For these reasons, such cables are towed at considerable depths (12–30 feet) below the water surface, which require great towing force. The streamer cable 100 of the present invention is smaller in outside diameter than the fluid-filled cables and is less affected by the above-noted elements. Additionally, the hydrophones 40 of the present invention exhibit less noise compared to a majority of the hydrophones. For these reasons, the streamer cable 100 of the present invention can be towed at depths of about 4 to 6 feet below the water surface in a number of applications.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An active cable section for use in a streamer cable for performing seismic surveys, comprising:
    a cable segment including:
    a central strain member along the length of the active season;
    a wire bundle around the central strain member for carrying power and data through the active cable section;
    an inner protective jacket around the central strain member;
    a foam jacket around the foam jacket for providing a predetermined buoyant force to the active cable section; and
    an outer protective jacket around the foam jacket for protecting the cable from the outside environment;
    at least one acoustic sensor formed around the periphery of the central member of the cable segment; and
    the active cable section further comprising a potting compound between the inner protective jacket and the outer protective jacket at the location of the at least one acoustic sensor on the cable segment.

2. The active cable section according to claim 1, wherein the inner protective jacket is formed by extruding a material from a group containing polyurethane, polyethylene and polycarbonate.

3. The active cable section according to claim 2, wherein the outer protective jacket is formed by extruding a material from a group containing polyurethane, polyethylene and polycarbonate.

4. The active cable section according to claim 3, wherein the potting compound is made from a material belonging to a group containing polyurethane, polyethylene and polycarbonate and wherein the potting compound bonds to the inner protective jacket and the outer protective jacket.

5. A streamer cable having a plurality of serially connected active cable sections for use in a streamer cable for performing seismic surveys, comprising:

a cable segment including:
 a central strain member along the length of each active section;
 a wire bundle around the central strain member for carrying power and data through each active cable section,
 an inner protective jacket around the central strain member;
 a foam jacket around the inner protective jacket for providing a predetermined buoyant force to each active cable section;
 an outer protective jacket around the foam jacket for protecting the cable from the outside environment; and
a plurality of hydrophones formed around and outside the central strain member;
a connector at each end of the active section for serially connecting the active sections to each other; and
a potting compound between the inner protective jacket and the outer protective jacket and formed on the cable segment beneath the at least one acoustic sensor and wherein the potting compound bonds to the inner protective jacket and the outer protective jacket.

6. A method for forming an active cable section for use in a streamer cable to be towed behind a vessel for performing seismic surveys in water-covered areas, comprising:

providing a longitudinal strain member along the active cable section for absorbing stresses when the streamer cable is towed behind the vessel;

forming an inner protective jacket around the longitudinal strain member;

forming a foam jacket around the inner protective jacket to provide a predetermined buoyant force to the active cable section when it is placed in water;

forming an outer protective jacket around the foam jacket for protecting the cable from the outside environment;

attaching a plurality of spaced hydrophones around and outside the longitudinal strain member, wherein the step of attaching the plurality of spaced hydrophones further comprises:

removing a selected segment of the inner protective jacket, the foam jacket and the outer protective jacket to the conductor along the longitudinal strain member and connecting each of said hydrophones to the conductor;

providing at least one conductor along the longitudinal strain member for conveying power and data; and forming a potting compound between the inner protective jacket and the outer protective jacket wherein the potting compound bonds to the inner protective jacket and the outer protective jacket providing a water block at each hydrophone location.

7. The method according to claim 6, wherein the potting compound is made from a material belonging to a group containing polyurethane, polyethylene and polycarbonate.

* * * * *